United States Patent
Shuey et al.

(10) Patent No.: US 6,816,538 B2
(45) Date of Patent: Nov. 9, 2004

(54) FREQUENCY HOPPING SPREAD SPECTRUM DECODER

(75) Inventors: Kenneth C. Shuey, Zebulon, NC (US); Robert T. Mason, Jr., Raleigh, NC (US); Brent R. Brian, Clayton, NC (US); Eugene W. Hodges, Holly Springs, NC (US)

(73) Assignee: Elster Electricity, LLC, Raleigh, NC (US)

( * ) Notice: Subject to any disclaimer, the term of this patent is extended or adjusted under 35 U.S.C. 154(b) by 98 days.

(21) Appl. No.: 10/183,930

(22) Filed: Jun. 26, 2002

(65) Prior Publication Data

US 2004/0001531 A1 Jan. 1, 2004

(51) Int. Cl.[7] .............................. H04B 1/69; H04B 1/707
(52) U.S. Cl. ...................... 375/136; 375/133; 375/131
(58) Field of Search ............................... 455/455, 464, 455/62, 161; 375/202, 133, 131, 136, 130, 138, 132, 137; 370/330

(56) References Cited

U.S. PATENT DOCUMENTS

| | | | | |
|---|---|---|---|---|
| 4,328,581 A | | 5/1982 | Harmon et al. ................. | 371/8 |
| 5,018,165 A | | 5/1991 | Sohner et al. .................. | 375/1 |
| 5,311,541 A | * | 5/1994 | Sanderford, Jr. ............. | 375/131 |
| 5,311,542 A | | 5/1994 | Eder ............................. | 375/1 |
| 5,377,222 A | | 12/1994 | Sanderford, Jr. ................ | 375/1 |
| 5,430,759 A | | 7/1995 | Yokev et al. ................. | 375/202 |
| 5,438,329 A | | 8/1995 | Gastouniotis et al. .. | 340/870.02 |
| 5,524,280 A | * | 6/1996 | Douthitt et al. ............... | 455/62 |
| 5,668,803 A | | 9/1997 | Tymes et al. ................ | 370/312 |
| 5,668,828 A | | 9/1997 | Sanderford, Jr. et al. .... | 375/202 |
| 5,809,059 A | * | 9/1998 | Souissi et al. ............... | 375/133 |
| 5,884,184 A | | 3/1999 | Sheffer ........................ | 455/521 |
| 5,892,758 A | | 4/1999 | Argyroudis .................. | 370/335 |
| 5,959,550 A | | 9/1999 | Giles ...................... | 340/870.02 |
| 6,034,988 A | | 3/2000 | VanderMey et al. ......... | 375/202 |
| 6,035,201 A | * | 3/2000 | Whitehead ................... | 455/455 |
| 6,061,604 A | | 5/2000 | Russ et al. ..................... | 700/90 |
| 6,137,423 A | | 10/2000 | Glorioso et al. ........ | 340/870.02 |
| 6,208,266 B1 | | 3/2001 | Lyons et al. ........... | 340/870.02 |
| 6,643,278 B1 | * | 11/2003 | Panasik et al. .............. | 370/330 |

OTHER PUBLICATIONS

*Brochure*: TRF6900 Single–Chip RF Transceiver, Texas Instruments, Copyright 2001.

* cited by examiner

*Primary Examiner*—Khai Tran
(74) *Attorney, Agent, or Firm*—Woodcock Washburn LLP

(57) ABSTRACT

The present invention is directed to a frequency hopping spread spectrum transceiver. The transceiver includes a microcontroller; a transmitter having a voltage controlled oscillator, a direct digital synthesizer, and a power amplifier; and a receiver having an amplifier, a mixer, an IF amplifier, a demodulator, and a data slicer. When transmitting, the transmitter communicates a preamble over a predetermined number of preamble channels, and thereafter communicate groups of data bytes that each comprise a subset of the data message over a predetermined sequence of data channels. When receiving, the receiver investigates the predetermined number of preamble channels to search for the preamble and tests the received bits to insure that the preamble and a start frame delimiter have been properly received to synchronize the receiver with the transmitter.

16 Claims, 5 Drawing Sheets

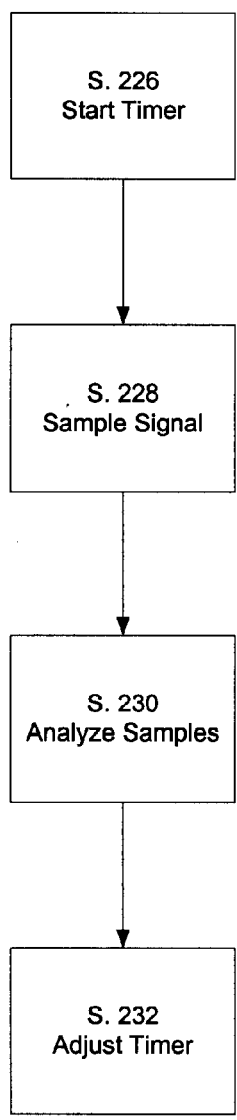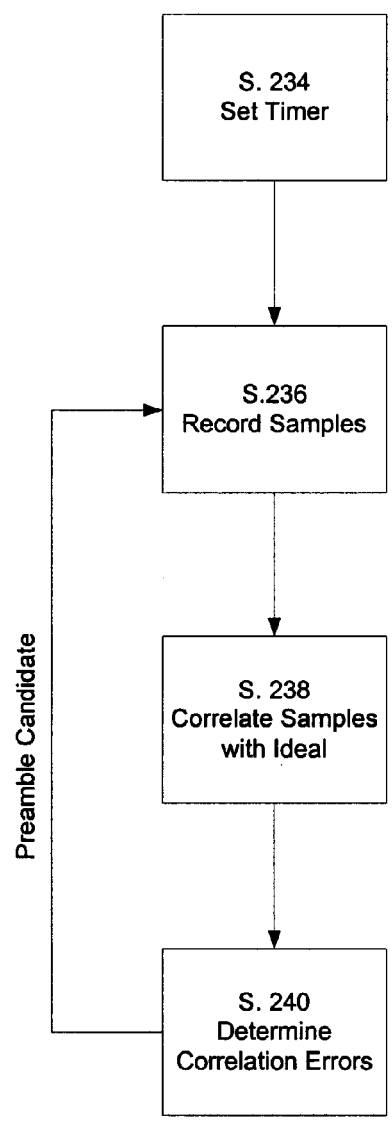
FIG. 4  FIG. 5

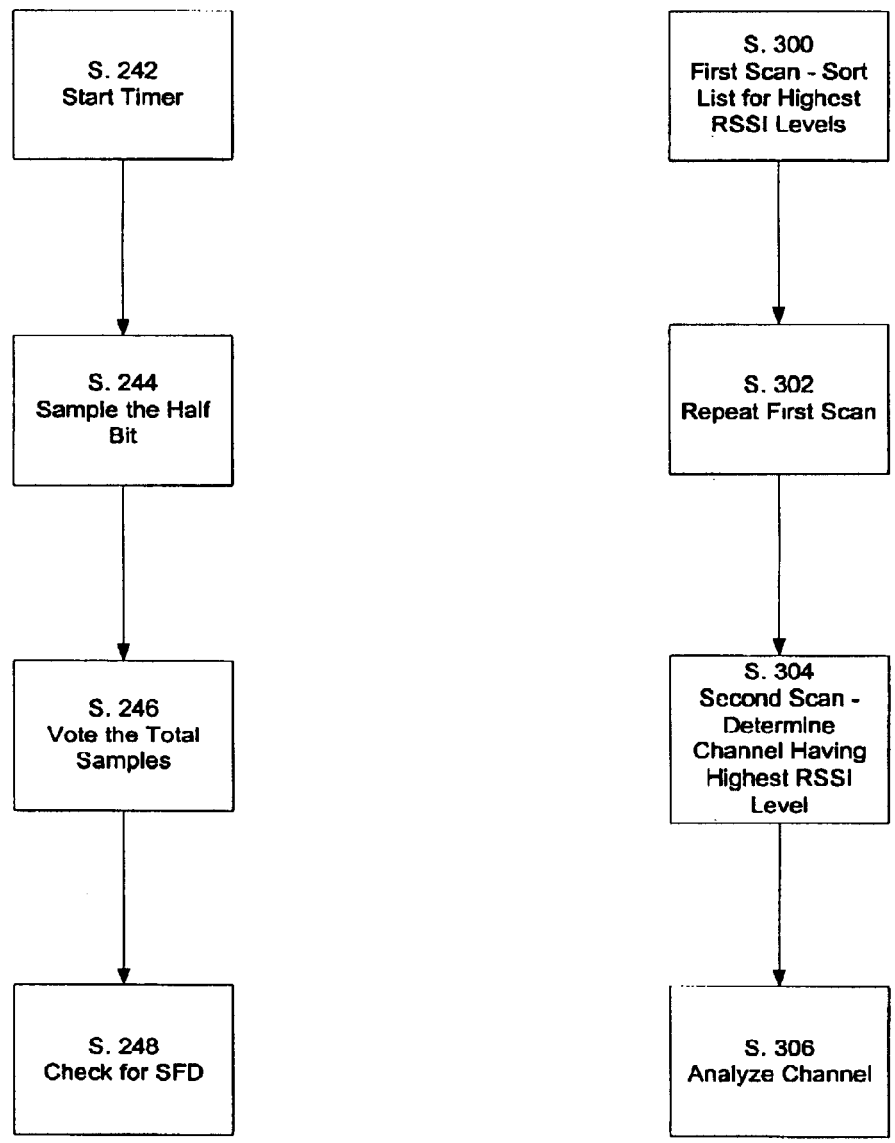

FREQUENCY HOPPING SPREAD SPECTRUM DECODER

FIELD OF THE INVENTION

The present invention relates generally to the field of communications. More particularly, the invention relates to a frequency hopping spread spectrum technique for accepting and sorting complex waveforms to lock onto a desired remote signal.

BACKGROUND OF THE INVENTION

Fixed network communication systems may operate using wire line or radio technology. Wire line technologies include utilizing the utility distribution lines and/or telephone lines. Wireless technologies may utilize the 902–928 MHz range, which can operate without a FCC license through the use of frequency hopping spread spectrum (FHSS) transmission, which spreads the transmitted energy over the band. According to FCC Regulations, for frequency hopping systems operating in the 902–928 MHz band, total output is as follows: 1 watt for systems employing at least 50 hopping channels; and, 0.25 watts for systems employing less than 50 hopping channels, but at least 25 hopping channels. See, 47 U.S.C. § 15.247.

FHSS systems meet the FCC specification by communicating to remote communication devices in synchronization, both in time and frequency. Using this approach, all devices know when to hop to the next channel in the sequence and what the next sequence channel is. A known FHSS system utilizes a hop rate that is faster than the data rate to send multiple sets of randomly selected frequencies in each message to distribute the transmitted energy over the communication band. This distribution is one of the FCC requirements to operate in the ISM band.

A disadvantage of the above is that it requires all devices to include a real time clock, which adds to the cost of the device. In addition, some type of battery storage system is required to maintain the real time clock in the event power should be removed from the device. Further, the requirement to step rapidly through the frequencies constrains the design of such devices and further limits cost reduction.

There have been attempts to utilize remote devices that operate asynchronously that gain synchronization with the transmitter by using a scanning receiver. One example of such a receiver is that of Harmon, U.S. Pat. No. 4,328,581. However, spurs and other unwanted signals interfere with the synchronization process in such receivers. Another problem with such systems is that the receiver is scanning channels based on a list and may be scanning channels other than the channel on which a preamble is being sent. To compensate for this, the transmitter must send the preamble for a period of time long enough to allow the receiver to scan for it and develop a bit timing. In these systems, spurs may be decoded as valid preambles, which adversely affects performance. Further, crosstalk problems may arise if weak signals from the transmitter are captured in the receiver scan sequence prior to determining the desired transmit channel.

Therefore, there is a need for a FHSS communication device that is cost efficient, meets FCC requirements for power distribution in the ISM band, and includes provisions for preventing unwanted signals from capturing the scanning receiver. The present invention is directed to these, as well as other, needs in the art.

SUMMARY OF THE INVENTION

The present invention addresses the needs identified above in that it provides for a novel method and apparatus that utilizes frequency hopping spread spectrum communications. In accordance with the present invention, there is provided an asynchronous frequency hopping spread spectrum receiver that includes an integrated circuit transceiver providing a PLL lock signal and a received signal strength indicator signal, and a microcontroller that receives the PLL lock signal and the received signal strength indicator signal. The receiver scans a predetermined list of channels and the microcontroller converts the received signal strength indicator signal for each scanned channel to a digital value representative of the received signal strength indicator signal and stores each the digital value in a received signal strength indicator list. The microcontroller next determines a subset of channels to scan for a preamble pattern. The subset of channels may be determined from a predetermined number of highest digital values stored in the received signal strength indicator list.

In accordance with a feature of the invention, the microcontroller rescans the predetermined list of channels a predetermined number of times and determines the subset of channels from the highest digital values after completing the predetermined number of rescans. A channel corresponding to a highest digital value contained in the subset of channels is scanned for the preamble pattern. If the channel corresponding to the highest digital value does not contain the preamble pattern, a next channel corresponding to a next highest value in the subset of channels is scanned for the preamble pattern.

In accordance with another aspect of the invention, there is provided a method of scanning for a preamble bit pattern in an asynchronous frequency hopping spread spectrum receiver. The method includes scanning a predetermined list of channels; converting a received signal strength indicator signal for each scanned channel to a digital value representative of the received signal strength indicator signal; storing the digital value in a received signal strength indicator list; and determining a subset of channels to scan for a preamble pattern, the subset of channels being determined from channels corresponding to a predetermined number of highest digital values stored in the received signal strength indicator list.

In accordance with yet another aspect of the invention, there is provided a process for scanning for a preamble bit pattern in an asynchronous frequency hopping spread spectrum receiver. The process includes scanning a predetermined list of channels a plurality of times to determine a subset of channels having higher signal strengths relative to all channels in the predetermined list, and successively scanning each channel within the subset of channels for a preamble bit pattern beginning with a channel having the highest signal strength until the preamble pattern is found.

These and other aspects of the present invention will be described in the following detailed description of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings:

FIG. 4 illustrates an exemplary carrier detect process;

FIG. 5 illustrates an exemplary carrier detect verification process;

FIG. 6 illustrates an exemplary carrier lock process; and

FIG. 7 illustrates an exemplary start frame delimiter and bit sampling process.

DETAILED DESCRIPTION OF THE PREFERRED EMBODIMENTS

Figure 1:
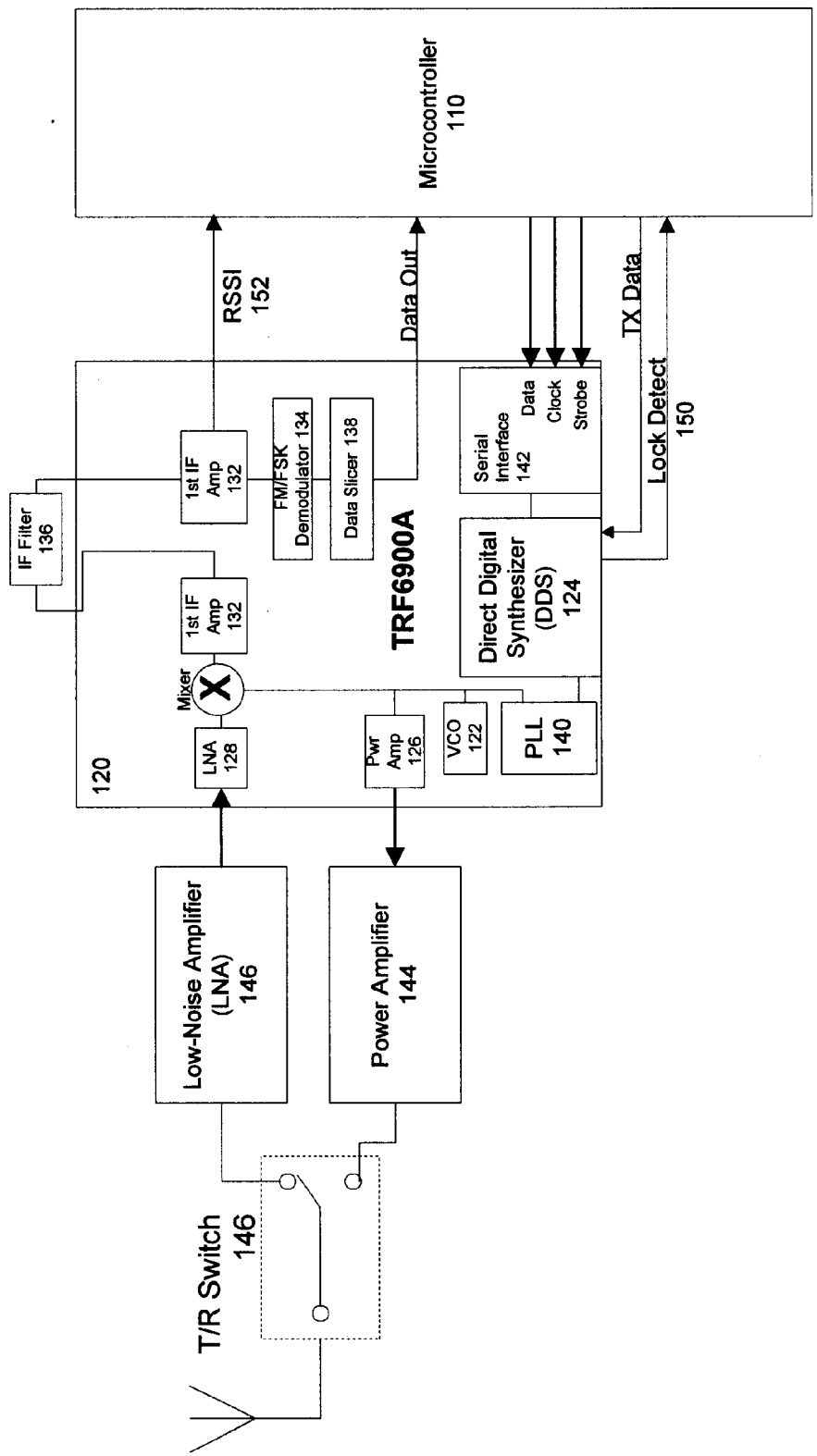
FIG. 1 illustrates an overview of an exemplary embodiment of a frequency hopping radio in accordance with the present invention.

Referring now to FIG. 1, there is illustrated an exemplary embodiment of a frequency hopping radio 100 in accordance with the present invention. The present invention is controlled by a microcontroller 110 and preferably implemented using a Texas Instruments TRF6900 transceiver 120, which is an integrated circuit that includes an FSK transceiver to establish a frequency-agile, half-duplex, bi-directional RF link. The chip may be used for linear (FM) or digital (FSK) modulated applications in the North American 915-MHz ISM band.

The transmitter portion of the transceiver 120 consists of an integrated voltage controlled oscillator (VCO) 122, a complete fully programmable direct digital synthesizer 124, and a power amplifier 126. The receiver portion consists of a low-noise amplifier 128, mixer 130, IF amplifier 132, limiter, FM/FSK demodulator 134 with an external LC tank circuit 136, and a data slicer 138.

The demodulator 134 may be used for analog (FM) and digital (FSK) frequency demodulation. The data slicer 138 preferably acts as a comparator. The data slicer 138 provides binary logic level signals, derived from the demodulated and low pass-filtered IF signal, that are able to drive external CMOS compatible inputs in the microcontroller 110. The noninverting input is directly connected to an internal reference voltage and the inverting input is driven by the output of the low-pass filter amplifier/post detection amplifier. The decision threshold of the data slicer 128 is determined by the internal reference voltage.

The direct digital synthesizer (DDS) 124 is based on the principle of generating a sine wave signal in the digital domain. The DDS 124 constructs an analog sine waveform using an N-bit adder counting up from 0 to 2 N in steps of the frequency register to generate a digital ramp waveform. Each number in the N-bit output register is used to select the corresponding sine wave value out of the sine lookup table. After the digital-to-analog conversion, a low-pass filter is preferably used to suppress unwanted spurious responses. The analog output signal can be used as a reference input signal for a phase locked loop 140. The PLL circuit 140 then multiplies the reference frequency by a predefined factor.

The microcontroller 110 uses a three-wire unidirectional serial bus (Clock, Data, Strobe) 142 to program the transceiver 120. The internal registers contain all user programmable variables including the DDS frequency setting registers as well as all control registers. At each rising edge of the Clock signal, the logic value on the Data terminal is written into a 24-bit shift register. Setting the Strobe terminal high loads the programmed information into the selected latch.

The microcontroller 110 controls the transceiver 120 and controls the transmission and reception of data. The microcontroller 110 also controls which channel the radio 100 listens to, or transmits on, by setting registers in the DDS 124. The DDS 124 registers, in turn, control the phase locked loop 140 and the VCO 122 to set the transmit and receive frequencies. Those skilled in the art will recognize that this is one of several possible methods for setting the transmit and receive frequencies.

In transmit mode, the transceiver 120 has a transmit output power of 0 dBm. An external Power Amplifier (PA) 144 provides an additional 24 dB of gain, resulting in a total output power of +24 dBm. The microcontroller 110 drives a Transmit/Receiver switch 146, which advantageously allows one antenna to be used for both the transmitter and receiver portions of the transceiver 120.

In receive mode, an external low noise amplifier (LNA) 148 and the internal LNA 128 are used to amplify the received signal. The received signal is "mixed down" by the mixer 123 for processing and then amplified. The signal strength indicator 152 is an output and is monitored by the microcontroller 110. The receiver then converts from a frequency-modulated signal to baseband signal using the demodulator 134 and the data slicer 138. The microcontroller 110 is responsible for decoding the raw baseband signal, synchronizing to bit edges.

As will be described in greater detail below, in receive mode, the microcontroller 110 uses the Serial Interface 142 to set the receive frequency and then looks for a valid preamble from a remote transmitting device. The process of looking for a valid preamble involves first scanning all 25 channels looking for single strength on one or more of the 25 channels. After scanning the channels and sorting the possible preamble channels based on RSSI, the receiver attempts to detect a valid preamble on the channel with the strongest RSSI. If a valid preamble is not detected, the microcontroller 110 uses the Serial Interface 142 to change the frequency to the channel with the next highest RSSI value. If no preamble is detected, the microcontroller "hops" channels every 1 ms. Other hop timing may be used. When a valid preamble is detected, the receiving device can synchronize with the transmitter to receive a packet of information, as detailed below. Synchronization involves hopping in sync with the transmitter to additional preamble and data channels.

A Lock Detect signal 150 from the transceiver 120 indicates that the radio 100 is locked on the desired receive frequency. After writing the Serial Interface 142, which instructs the radio 100 to change the receiver channel, the microcontroller 110 waits for Lock Detect 150 to be asserted, signaling the receive channel can be monitored for a stable received signal. This settling time, in addition to the time required to write the registers via the Serial Interface 142, determines the per channel scan time (e.g., 1 ms).

An exemplary embodiment implemented using the radio 100 will now be explained. The present invention does not require a separate clock or other synchronization information, nor does it require an indication of a valid signal from the transceiver 120 to decode the incoming signal. The microcontroller 110 performs the tasks of decoding and validating the signals, where each signal preferably contains a preamble, start frame delimiter (SFD) and a data frame. The SFD indicates that the preamble has ended and that the data frame will follow. In accordance with the present invention, the SFD must appear within a predetermined maximum time after the start of the preamble in order for a signal to be considered valid. Following receipt of a valid SFD, the microcontroller 110 maintains bit timing and records the data bits.

Figure 2:
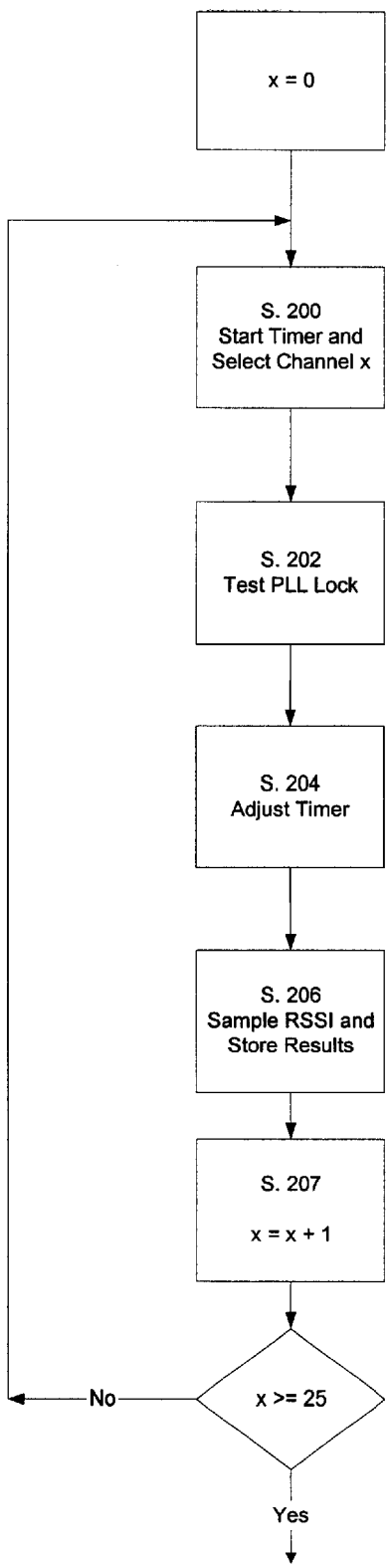
FIG. 2 illustrates an exemplary receive signal strength indicator (RSSI) scan process.

Referring now to FIG. 2, a Received Signal Strength Indictor Scan process of the overall decoding process of the present invention will now be described. The decoding process involves sampling the incoming signal rapidly and correlating a set of samples with a known pattern to determine if a preamble is present. In accordance with the present invention, the preamble preferably begins with a zero and ends with a one.

The process begins by setting a counter (x) to zero, then at step 200, a timer in the microcontroller 110 is started and a channel is selected. The channel is selected sequentially from a list of channels (e.g., 25 channels) to be scanned. At step 202, the microcontroller 110 tests the PLL lock detect indicator 150 at intervals equal to a bit time (e.g., 56.48 $\mu$s) until a lock is established. Once a lock is established at step 202, the timer is set at step 204 to allow the receiver to settle for a configurable settling time, where the present invention uses an RSSI settling time of 200 $\mu$s. At step 206, the Receive Signal Strength Indicator (RSSI) 152 is monitored by the microcontroller 110 using an analog-to-digital converter within the microcontroller 110. The microcontroller 110 stores the results of the converted RSSI indicator 152 in a list that corresponds to the channel list noted above by position and length. At step 207, a channel counter value (x) is incremented by one and then tested to see if it is greater than or equal to 25. If x is less than 25, processing returns to step 200 to sample the next channel. If the counter is equal to or greater than 25, then processing exits to search the list (see, FIG. 3) that was created through the process of FIG. 2.

Figure 3:
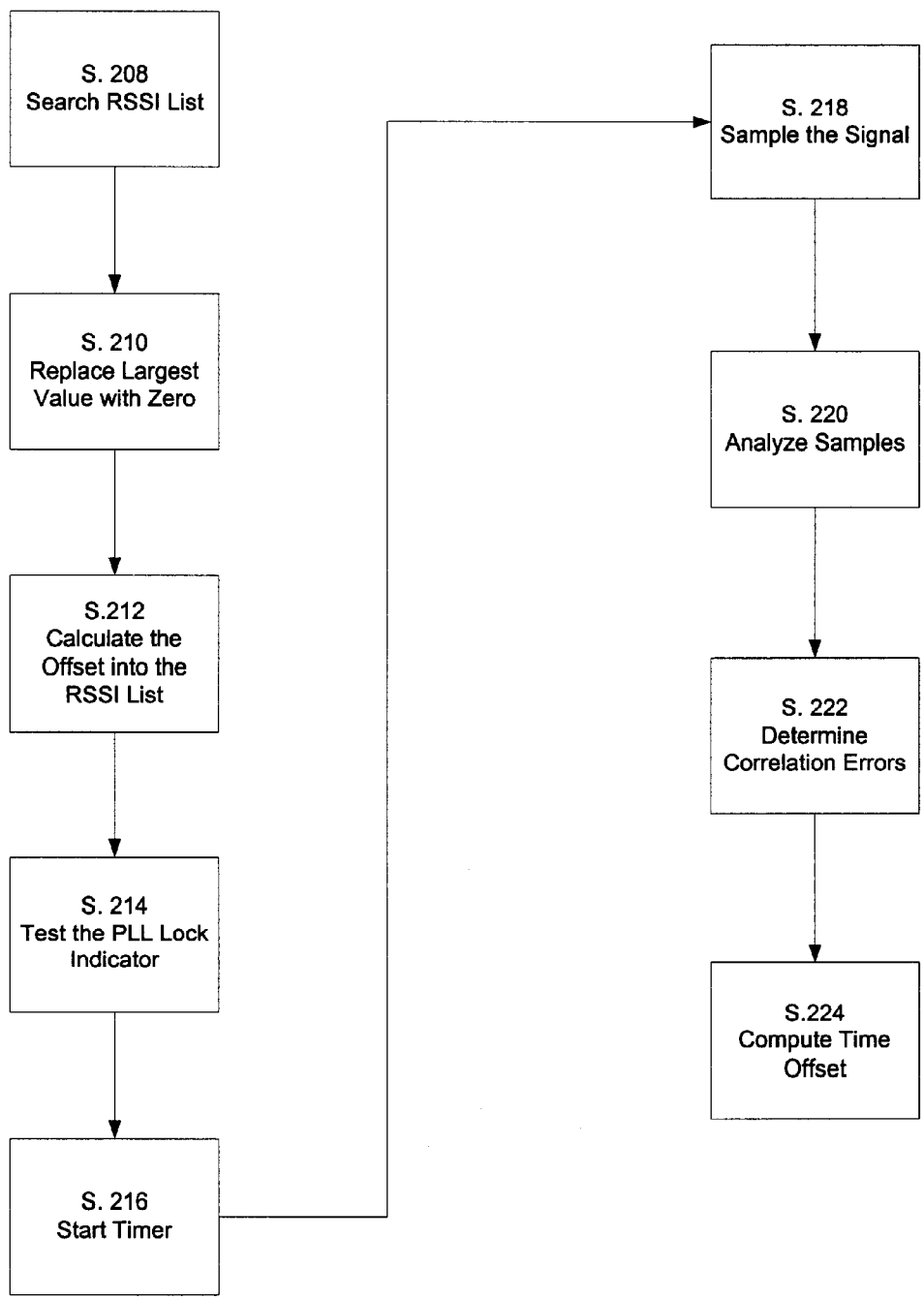
FIG. 3 illustrates an exemplary two scan process for ranking the RSSI.

Referring now to FIG. 3, there is illustrated the carrier detect portion of the decoding process of the present invention. At step 208, the RSSI list created at step 206 is searched for the largest value that is greater than a configurable RSSI threshold. This value corresponds to the strongest signal, as noted above. If a value greater than the RSSI threshold is not found, then the RSSI scan process of FIG. 2 is repeated. At step 210, the largest value determined is replaced with a zero. Next, at step 212, the offset into the RSSI list of the signal determined at step 208 to have the largest value is calculated and used to select a channel value at the same offset into the channel list. The transceiver 120 is then set to receive on this channel. For example, if the signal determined in step 208 is the ninth channel in the RSSI list, the transceiver will be set to the ninth channel on the channel list. At step 214, the PLL lock 150 is tested at intervals equal to the bit time (56.48 $\mu$s) until the lock is established.

At step 216, a timer in the microcontroller 110 is set to trigger at a time equal to 11 bit times (e.g., 11*56.48 $\mu$s). At step 218, the signal on the channel determined in step 212 is sampled for two preamble bit times (e.g., 2*56.48 $\mu$s). In accordance with the present invention, 32 samples over the two preamble bit times are recorded. Alternatively, sub-samples may be recorded between samples and used to form samples by simple voting if processor speed allows.

At step 220, the samples are analyzed as two 16 sample halves. Each half is compared with 16 ideal patterns. In accordance with the present invention, the ideal patterns are generated from the 16 rotations of 0xF00F. At step 222, correlation is performed by performing an XOR (exclusive OR) operation on the four bytes of the samples with each of the four bytes of the ideal pattern. The number of bit positions in which the samples and pattern differ (Hamming distance) is the number of correlation errors for that pattern. The number of ones in the XOR result is the number of errors and is preferably calculated using the sum of four lookups in a 256-byte table containing the number of ones in each index byte. The number of rotations needed to achieve the pattern with the fewest errors is stored by the microcontroller 110. If the number of correlation errors is within a configurable tolerance, the signal is considered to be a preamble candidate. The present invention uses a default tolerance of 3 bit errors. If the number of correlation errors is greater than the tolerance, the carrier detect process of FIG. 3 is repeated, using the channel with the next highest RSSI value. If this next highest RSSI value does not exceed the RSSI threshold, the process restarts at FIG. 2.

At step 224, the value of a free running timer set at step 216 is used to compute a time offset to the next occurrence of the identical pattern in accordance with the number of pattern matching rotations stored at step 222. The pattern is matched to one of a list of patterns and the time adjustment is performed such that the carrier detect verification (i.e., repeating the 32 samples looking for valid preamble) is now aligned with the pattern that was found on the first attempt. In other words, the timer is adjusted so that an ideal carrier detect verification matches the pattern from the first carrier detect.

FIG. 4 illustrates a carrier detect verify process, which occurs over two bit times of sampling. At step 226, when the timer set at step 216 (FIG. 3) expires, another timer in the microcontroller is set to expire in six bit times (6*56.48 $\mu$s). At step 228, the signal on the transceiver channel set at step 212 is sampled for two bit times (2*56.48 $\mu$s). 32 samples over the two preamble bit times are recorded by the microcontroller 110. As described above, sub-samples may be recorded between samples and used to form samples by simple voting if processor speed allows.

Also at step 230, the 32 samples are analyzed as two 16 sample halves and compared to the pattern recorded at step 222 (FIG. 3). The sample must contain less than the number of configurable correlation errors plus two. If the errors in the sample are found to exceed the limit, the carrier detect process of FIG. 3 is repeated using the channel with the next highest RSSI value. If this next highest RSSI value does not exceed the RSSI threshold, the process restarts at FIG. 2.

At step 232, the free running timer set at step 226 is adjusted to expire in order to center the sampling period in a carrier lock process (described below with reference to FIG. 5) across a down edge of a preamble bit. The free running timer is adjusted in accordance with a value computed using the number of pattern rotations stored at step 222.

Referring now to FIG. 5, there is illustrated the carrier lock process of the present invention. At step 234, a timer is set to expire after a time period equal to seven bit times (7*56.48 $\mu$s). At step 236, 16 samples over one-half of a preamble bit time beginning one-quarter of a bit time prior to the previously inferred location of the down edge are recorded. The location was inferred through the carrier detect and carrier detect verify processes, described above.

At step 238, the 16 samples are correlated with 15 ideal preamble patterns and 15 inverted ideal preamble patterns, which are stored in a table. The table is preferably organized to represent inverted preamble patterns at one end of the table and preamble patterns at the other end. The patterns are in a sequence that represents the desired pattern shifted to the left and then right by one bit, two bits, etc. In each successive carrier lock, the starting point in the table is adjusted in order to refine the timing to avoid failure. A pattern match in the inverted portion of the table indicates the beginning of the SFD.

At step 240, if the number of correlation errors is within the predetermined tolerance for the preamble correlation pattern, the signal is considered to be a preamble candidate by the microcontroller 110. The timer set at step 234 is adjusted to center on the next down edge and the process repeats.

If at step 240 the number of correlation errors is within the predetermined tolerance for the SFD correlation pattern, the SFD has started. Bit sampling is performed to find the rest of the SFD pattern as described below with reference to FIG. 6. The tolerances for carrier lock is preferably the same in both cases, regardless of whether a preamble bit or a SFD bit is being detected. The tolerance is configurable, but the present invention uses a default of 3 bit errors.

If a total of two carrier lock preamble correlation attempts fail or the total preamble time before the SFD is exceeded, the signal is no longer considered a preamble candidate and the decoding process returns to perform the RSSI scan of FIG. 2.

Referring now to FIG. 6, there is illustrated the SFD and bit sampling process of the present invention. At step 242 a bit-center timer is started to trigger in the middle of each half-bit. Herein, a bit is a Manchester encoded bit made up of two half bits of one-half bit time. Manchester Encoding is well known in the art an encodes a logic 0 by indicated by a 0 to 1 transition at the center of a bit and a logic 1 by indicating a 1 to 0 transition at the center of a bit.

At step 244, the half-bit is sampled as many times a possible in accordance with processor speed. It is preferable to begin sampling one-half of a sample period prior to the half-bit center.

At step 246, equal numbers of samples from each half of the Manchester bit are voted by bit-wise first inverting the first samples and then counting the number of samples of the 16 that are ones. If fewer than half are ones, the Manchester bit is considered a zero data bit. If half or more are ones, then the Manchester bit is considered to be a one data bit.

In accordance with the present invention, the SFD is composed of 32 Manchester one bits followed by the following Manchester bits: 0000 1100 1011 1101 (left bit first). Other sequences of bits may be used. No bit errors are tolerated in the SFD. If the SFD is not found, then the RSSI scan of FIG. 2 is repeated.

After the SFD found, the transceiver 120 is in synchronization with the transmitter, and continues to sample the bits to receive the data from transmitted by the transmitter.

Referring now to FIG. 7, in accordance with an aspect of the present invention, a two-step RSSI scan process may be implemented to determine which of the channels is the appropriate data channel. At step 300, the first scan is performed wherein the receiver scans the complete list of channels, quantifies the RSSI indicator 152 and sorts the list for the strongest RSSI levels. A subset of the strongest channels (e.g., 3 channels) may be developed from this first scan of the channels. The subset of channels may consist of more or less channels than three.

At step 302, the first scan is repeated a predetermined number of times, e.g., four times, where a subset of strongest channels is developed for each scan. The scan may be repeated an alternate number of times. At the completion of the final RSSI first scan, the strongest channels from all of the scans are sorted by RSSI level.

At step 304, a second scan is performed wherein a scan is performed of the highest RSSI level, as determined by the first scan process above. At step 306, the strongest signal is analyzed for preamble and a start frame delimiter (SFD) bit patterns that will further qualify the channel as the transmit channel. The process of determining if the SFD bit patterns are present in a particular channel has been described in the preceding paragraphs. If the preamble bit patterns are not present, then the second strongest channel and so on is analyzed for valid preamble and SFD bit patterns until found. If the preamble bit pattern is not found during the second scan process, the first scan process is repeated.

Various modifications of the invention, in addition to those described herein, will be apparent to those of skill in the art in view of the foregoing description. Such modifications are also intended to fall within the scope of the appended claims. For example, a bit time other than 56.48 $\mu$s may be used. In addition, bits may be encoded using an encoding scheme other than Manchester Encoding.

What is claimed:

1. An asynchronous frequency hopping spread spectrum receiver, comprising:

an integrated circuit transceiver providing a PLL lock signal and a received signal strength indicator signal; and a microcontroller that receives said PLL lock signal and said received signal strength indicator signal, wherein said receiver scans a predetermined list of channels and said microcontroller converts said received signal strength indicator signal for each scanned channel to a digital value representative of said received signal strength indicator signal and stores each said digital value in a received signal strength indicator list, wherein said microcontroller determines a subset of channels to scan for a preamble pattern, said subset of channels being determined from a predetermined number of highest digital values stored in said received signal strength indicator list, wherein said subset of channels are sampled over a predetermined number bit times, and wherein a correlation is performed on a sampled subset of channels to determine the presence of said preamble pattern.

2. The receiver as recited in claim 1, wherein said microcontroller rescans said predetermined list of channels a predetermined number of times.

3. The receiver as recited in claim 2, wherein said microcontroller determines said subset of channels from the highest digital values after completing said predetermined number of rescans.

4. The receiver as recited in claim 1, wherein a channel corresponding to a highest digital value contained in said subset of channels is scanned for said preamble pattern.

5. The receiver as recited in claim 4, wherein if said channel corresponding to said highest digital value does not contain said preamble pattern, a next channel corresponding to a next highest value in said subset of channels is scanned for said preamble pattern.

6. The receiver as recited in claim 5, wherein successive channels corresponding to successively next higher digital values are scanned until said preamble pattern is found.

7. A method of scanning for a preamble bit pattern in an asynchronous frequency hopping spread spectrum receiver, comprising:

scanning a predetermined list of channels;

converting a received signal strength indicator signal for each scanned channel to a digital value representative of said received signal strength indicator signal;

storing each said digital value in a received signal strength indicator list;

determining a subset of channels to scan for a preamble pattern, said subset of channels being determined from channels corresponding to a predetermined number of highest digital values stored in said received signal strength indicator list sampling said subset of channels over a predetermined number bit times; and correlating said sampled subset of channels to determine the presence of said preamble pattern.

8. The method as recited in claim 7, further comprising rescanning said predetermined list of channels a predetermined number of times.

9. The method as recited in claim 8, further comprising determining said subset of channels from the highest digital values after completing said predetermined number of rescans.

10. The method as recited in claim 7, further comprising scanning a channel corresponding to a highest digital value contained in said subset of channels for said preamble pattern.

11. The receiver as recited in claim 10, further comprising scanning a next channel corresponding to a next highest value in said subset of channels for said preamble pattern if said channel corresponding to said highest digital value does not contain said preamble pattern.

12. The receiver as recited in claim 11, further comprising successive channels corresponding to successively next higher digital values until said preamble pattern is found.

13. A process for scanning for a preamble bit pattern in an asynchronous frequency hopping spread spectrum receiver, comprising:

scanning a predetermined list of channels a plurality of times to determine a subset of channels having higher signal strengths relative to all channels in said predetermined list;

successively scanning each channel within said subset of channels for a preamble bit pattern beginning with a channel having the highest signal strength until said preamble pattern is found;

sampling said subset of channels over a predetermined number bit times; and correlating said sample subset of channels determine the presence of said preamble pattern.

14. The method as recited in claim 13, wherein said receiver provides a received signal strength indicator that is converted to a digital value to determine said signal strengths.

15. The method as recited in claim 13, wherein said subset of channels includes at least three channels.

16. The method as recited in claim 13, wherein said predetermined list of channels comprises at least 25 channels.

* * * * *